US012587693B2

(12) United States Patent
Nihei et al.

(10) Patent No.: US 12,587,693 B2
(45) Date of Patent: Mar. 24, 2026

(54) ARTIFICIALLY INTELLIGENT AD-BREAK PREDICTION

(71) Applicant: Disney Enterprises, Inc., Burbank, CA (US)

(72) Inventors: Taryn Nihei, New York, NY (US); Giuseppe Manzari, Sunland, CA (US); Monica Alfaro Vendrell, Barcelona (ES); Francesc Josep Guitart Bravo, Lleida (ES); Daniel Brooks, Pasadena, CA (US); Brian Coburn, Burbank, CA (US); Anthony M. Accardo, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 148 days.

(21) Appl. No.: 18/143,485

(22) Filed: May 4, 2023

(65) Prior Publication Data

US 2024/0373073 A1      Nov. 7, 2024

(51) Int. Cl.
| | |
|---|---|
| *H04N 21/234* | (2011.01) |
| *G06T 7/90* | (2017.01) |
| *H04N 5/14* | (2006.01) |
| *H04N 21/44* | (2011.01) |
| *H04N 21/81* | (2011.01) |
| *H04N 21/845* | (2011.01) |

(52) U.S. Cl.
CPC ......... *H04N 21/23418* (2013.01); *G06T 7/90* (2017.01); *H04N 5/147* (2013.01)

(58) Field of Classification Search
None
See application file for complete search history.

(56) References Cited

U.S. PATENT DOCUMENTS

| | | | |
|---|---|---|---|
| 10,157,318 | B2 | 12/2018 | Smolic et al. |
| 10,248,864 | B2 | 4/2019 | Guiu et al. |
| 10,506,267 | B2 | 12/2019 | Robert |
| 10,674,111 | B2 | 6/2020 | Arana et al. |
| 10,701,365 | B2 | 6/2020 | Arana et al. |

(Continued)

OTHER PUBLICATIONS

U.S. Appl. No. 18/041,794, filed Feb. 15, 2023.

*Primary Examiner* — Hung Q Dang
(74) *Attorney, Agent, or Firm* — Farjami & Farjami LLP

(57) ABSTRACT

A system includes a hardware processor and a memory storing software code. The software code is executed to receive media content including a video and an audio component, recognize the media content as ad-slugged or seamless content, and detect black video frames of the media content. For ad-slugged content, the software code further detects silent video frames, and identifies, using the black video frames and the silent video frames, candidate ad-insertion point(s) and a probability score associated with each, to provide ad-break prediction(s). For seamless content, the software code performs evaluations of blackness transitions between sequential video frames, and one or more evaluations of audio continuity across respective one or more sequences of the black video frames, and identifies, using the black video frames and the evaluations, candidate ad-insertion point(s) and a probability score associated with each to provide ad-break prediction(s). The ad-break prediction(s) are further provided as system outputs.

20 Claims, 6 Drawing Sheets

(56)                    References Cited

U.S. PATENT DOCUMENTS

| | | | |
|---|---|---|---|
| 11,010,398 B2 | 5/2021 | Guiu et al. | |
| 11,064,268 B2 | 7/2021 | Guiu et al. | |
| 11,074,456 B2 | 7/2021 | Guiu et al. | |
| 11,157,777 B2 | 10/2021 | Guiu et al. | |
| 11,336,930 B1* | 5/2022 | Gupta | G06V 20/635 |
| 11,386,664 B2 | 7/2022 | Guiu et al. | |
| 11,482,004 B2 | 10/2022 | Guiu et al. | |
| 2018/0005041 A1 | 1/2018 | Narayan et al. | |
| 2019/0098345 A1* | 3/2019 | Rahman | H04N 21/25891 |
| 2020/0204838 A1* | 6/2020 | Badawiyeh | G06Q 30/0269 |
| 2020/0213644 A1* | 7/2020 | Gupta | H04N 21/25891 |
| 2021/0389989 A1 | 12/2021 | Guiu et al. | |
| 2022/0101013 A1* | 3/2022 | Chatoo | H04N 21/23418 |
| 2023/0007365 A1 | 1/2023 | Guiu et al. | |

* cited by examiner

Figure 1:
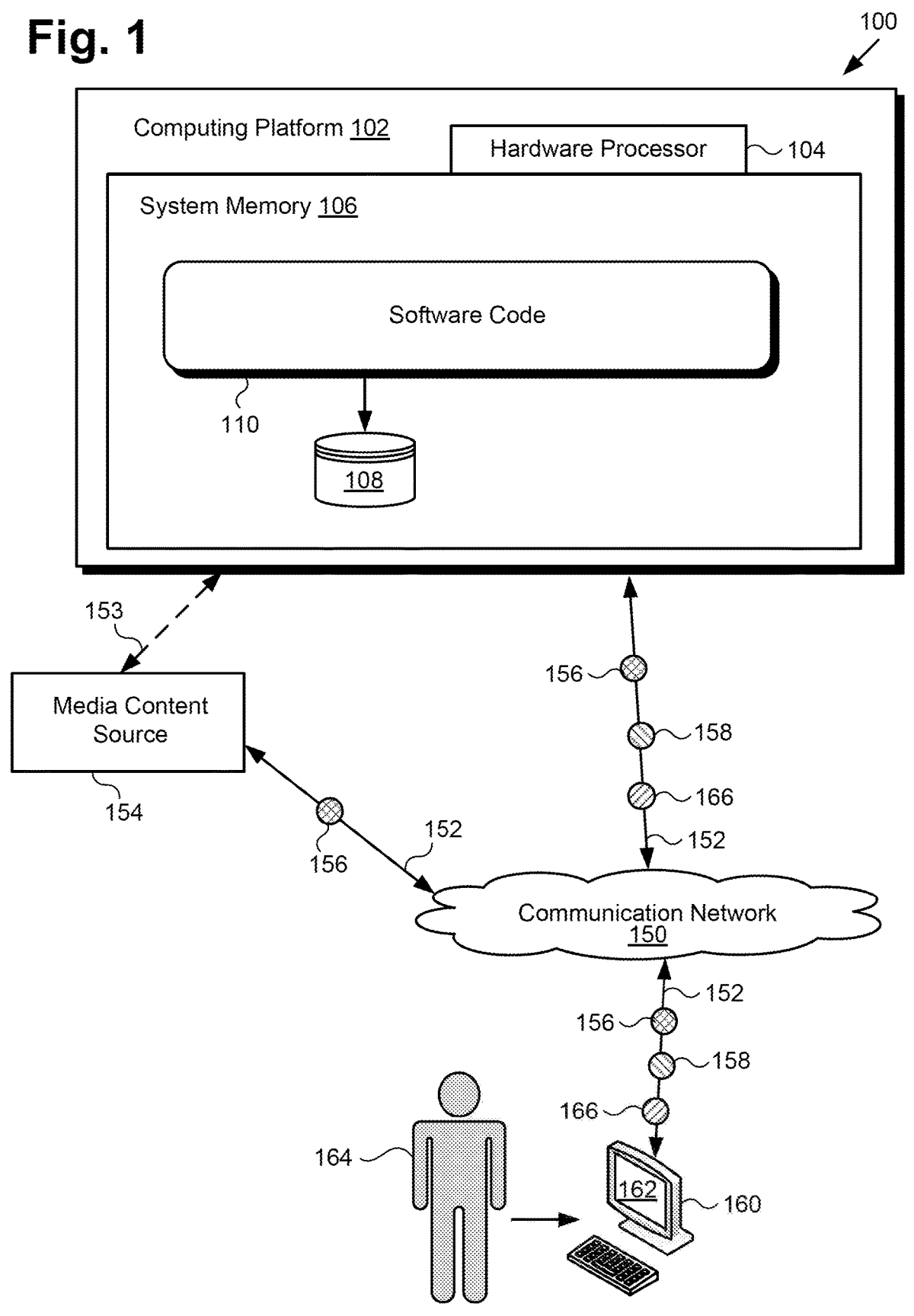

Computing Platform 102

Hardware Processor ⌐104

System Memory 106

Software Code

110

108

153

Media Content Source

154

156

158

166

152

156

152

Communication Network 150

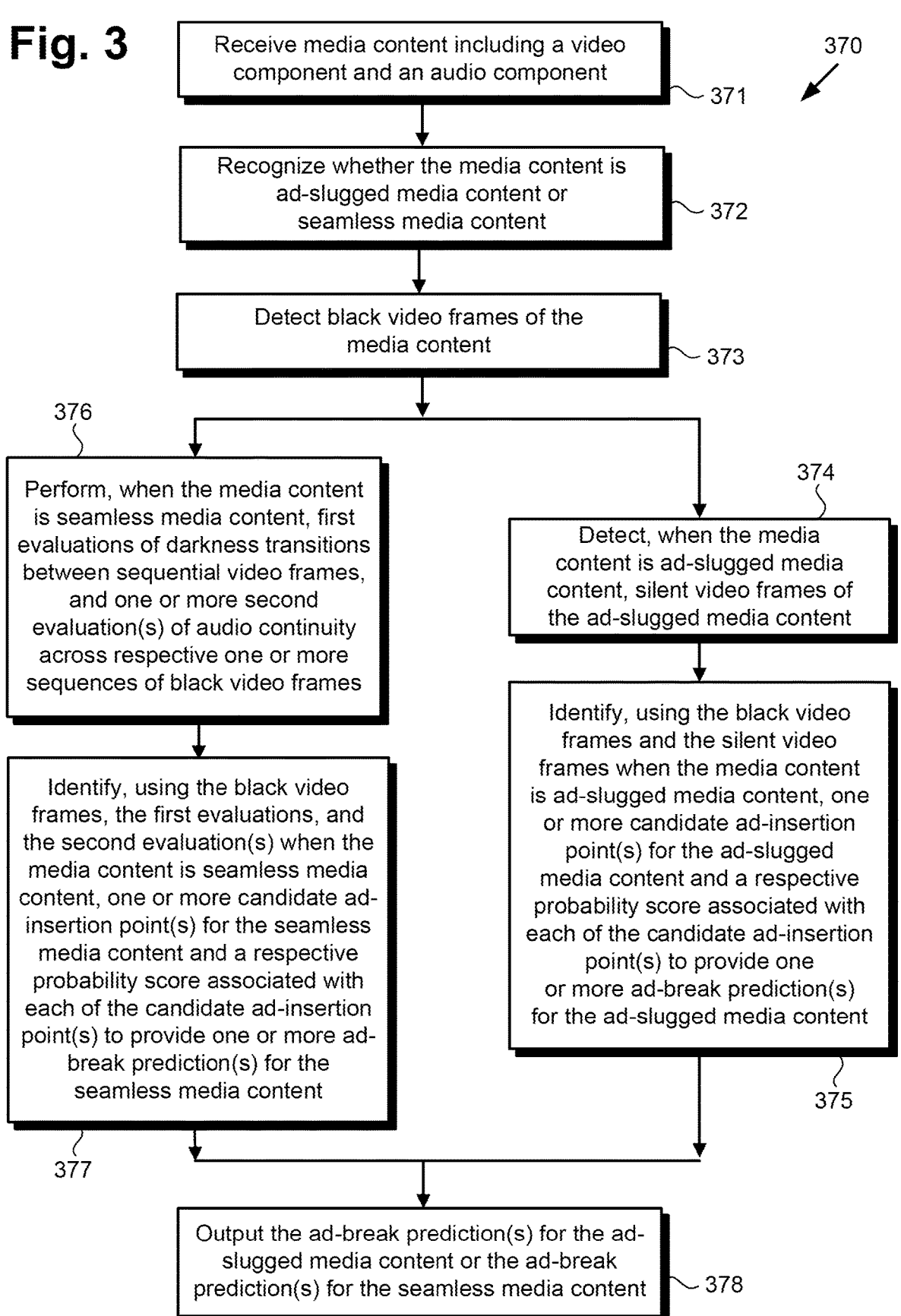

370

Receive media content including a video component and an audio component ~ 371

Recognize whether the media content is ad-slugged media content or seamless media content ~ 372

Detect black video frames of the media content ~ 373

376

Perform, when the media content is seamless media content, first evaluations of darkness transitions between sequential video frames, and one or more second evaluation(s) of audio continuity across respective one or more sequences of black video frames

374

Detect, when the media content is ad-slugged media content, silent video frames of the ad-slugged media content Identify, using the black video frames, the first evaluations, and the second evaluation(s) when the media content is seamless media content, one or more candidate ad-insertion point(s) for the seamless media content and a respective probability score associated with each of the candidate ad-insertion point(s) to provide one or more ad-break prediction(s) for the seamless media content

377

Identify, using the black video frames and the silent video frames when the media content is ad-slugged media content, one or more candidate ad-insertion point(s) for the ad-slugged media content and a respective probability score associated with each of the candidate ad-insertion point(s) to provide one or more ad-break prediction(s) for the ad-slugged media content

375

Output the ad-break prediction(s) for the ad-slugged media content or the ad-break prediction(s) for the seamless media content ~ 378

ARTIFICIALLY INTELLIGENT AD-BREAK PREDICTION

BACKGROUND

Due to its nearly universal popularity as a content medium, ever more visual media content is being produced and made available to consumers. However, high-quality visual media content is expensive to produce, typically requiring the participation of numerous talented artists, performers, and technical professionals. Advertisements (ads) are features that enable high-quality, costly visual media content to be made available to consumers at a reduced price relative to its intrinsic artistic value.

Nevertheless, ads can be a double-edged sword for media content distributors and consumers alike. On the one hand, ads make subscribing to a content delivery service, for example, more affordable for consumers, thereby potentially growing a subscription base while delivery good value to the consumer. On the other hand, too many, or poorly placed ads can be significantly off-putting to the content consumption experience, thereby potentially driving existing subscribers away. Consequently, it is advantageous for both consumers and content distributors that ads inserted into content be in effect "content aware," in the sense that those ads are presented so as to produce the least possible disruption to the media content consumption experience.

Significant challenges to identifying content aware ad-insertion points, or "ad-breaks," include the size of the content libraries made available to consumers by most content delivery platforms, as well as the diversity of that content. Due to that content diversity there is no "one size fits all." or even "one size fits many," solution to the challenge of making ads appear to be content aware. As a result, each different content title must typically be evaluated based on its own narrative flow, and that process has traditionally been performed manually, by human editors. However, due to the increasing proliferation of visual media content being produced and distributed, that human, manual process is too expensive and too time consuming to remain feasible. Thus, there is a need in the art for an artificial intelligence (AI) based solution for substantially automating the process of identifying optimum ad-breaks in visual media content.

BRIEF DESCRIPTION OF THE DRAWINGS

FIG. 1 shows a diagram of an exemplary artificial intelligence (AI) system for predicting ad-breaks, according to one implementation;

FIG. 3 shows a flowchart outlining an exemplary method for performing AI-based ad-break prediction, according to one implementation.

DETAILED DESCRIPTION

Figure 2A:
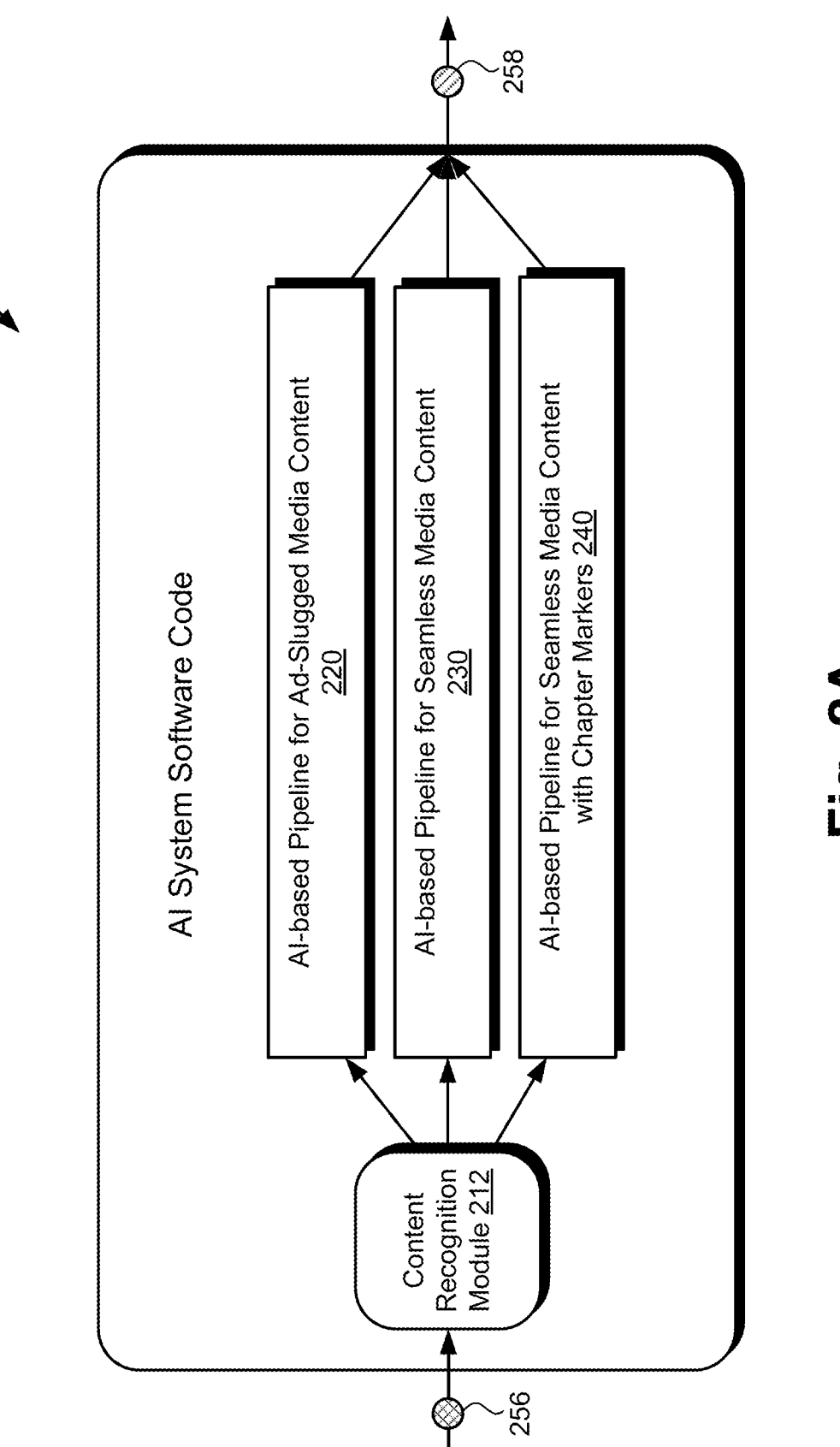
FIG. 2A shows an exemplary diagram of software code suitable for use by the AI system shown in FIG. 1, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses artificial intelligence (AI) based systems and methods for identifying content aware ad-breaks in visual media content that are predicted to be minimally disruptive to the experience of consuming that content. The content to which the present AI-based ad-break prediction solution may be applied can take a variety of forms, including seamless media content, seamless media content with chapter markers, and advertisement-slugged (ad-slugged) media content, for example. It is noted that "ad-slugged media content" (hereinafter also referred to as "ad-slugged content") refers to content that includes one or more pre-existing ad-slugs, i.e., pre-existing sequences of black frames free of audio and usable as ad-breaks. It is further noted that, as defined in the present application, the expression "black," as applied to video frames, refers to frames that are completely dark or are a substantially uniform dark gray.

The expression "seamless media content" (hereinafter also referred to as "seamless content") refers to content that is entirely free of ad-slugs and other predetermined indicators of narrative transition. The expression "seamless media content with chapter markers" (hereinafter also referred to as "seamless content with chapter markers") refers to content that is free of ad-slugs or other pre-exiting breaks in the content. but includes metadata or other signifiers identifying timestamps or frames deemed by creative authorities of the content to be suitable as transition points in the narrative flow of the content.

It is also noted that the present AI-based ad-break prediction solution may advantageously be implemented as automated systems and methods. As defined in the present application, the terms "automation," "automated," and "automating" refer to systems and processes that do not require the participation of a human user, such as a human editor or system administrator. For example, although in some implementations a human editor or system administrator may review the performance of the systems and methods disclosed herein, and, in some cases may provide feedback for use in ongoing improvement of the machine learning (ML) models utilized in the present AI-based ad-break prediction solution, that human involvement is optional. Thus, in some implementations, the processes described in the present application may be performed under the control of hardware processing components of the disclosed systems.

Moreover, as defined in the present application, the expression ML model refers to a mathematical model for making future predictions based on patterns learned from samples of data or "training data." Various learning algorithms can be used to map correlations between input data and output data. These correlations form the mathematical model that can be used to make future predictions on new input data. Such a predictive model may include one or more logistic regression models, Bayesian models, or neural networks (NNs). Moreover, a "deep neural network," in the context of deep learning, may refer to an NN that utilizes a plurality of hidden layers between input and output layers, which may allow for learning based on features not explicitly defined in raw data. In various implementations, NNs may be trained as classifiers and may be utilized to perform image processing and natural-language processing.

FIG. 1 shows a diagram of exemplary AI system 100 for predicting ad-breaks, according to one implementation. AI system 100 includes computing platform 102 having hardware processor 104 and system memory 106 implemented as a computer-readable non-transitory storage medium. As shown in FIG. 1, according to some implementations, system memory 106 stores software code 110 and marker endpoint storage database 108. which stores one or more of the timestamps or frame numbers of ad-breaks in media content that are predicted to be viable by software code 110.

As further shown in FIG. 1, AI system 100 may be implemented in a use environment including media content source 154 providing media content 156 and user system 160 including display 162. In addition, FIG. 1 shows user 164 of user system 160 who may be an authorized system administrator of AI system 100, network communication links 152 communicatively coupling media content source 154 and user system 160 with AI system 100 via communication network 150. Also shown in FIG. 1 are one or more ad-break predictions 158 output by AI system 100, and feedback data 166 provided to AI system 100 by user 164.

It is noted that although AI system 100 may receive media content 156 from media content source 154 via communication network 150 and network communication links 152, in some implementations, media content source 154 may take the form of a media content source integrated with computing platform 102, or may be in direct communication with AI system 100, as shown by dashed communication link 153. Moreover, in some use cases, as also shown in FIG. 1, AI system 100 may receive media content 156 from user system 160 under the control of user 164.

Media content 156 may include audio-video (AV) content in a variety of forms. For example, media content 156 may be or include episodic television (TV) content or movie content. In addition, or alternatively, in some implementations, media content 156 may be or include digital representations of persons. fictional characters, locations, objects, and identifiers such as brands and logos, for example, which populate a virtual reality (VR), augmented reality (AR), or mixed reality (MR) environment. Moreover, media content 156 may depict virtual worlds that can be experienced by any number of users synchronously and persistently, while providing continuity of data such as personal identity, user history, entitlements, possessions, payments, and the like. It is noted that in some implementations, media content 156 may be or include a hybrid of traditional AV and fully immersive VR/AR/MR experiences, such as interactive video.

It is further noted that although FIG. 1 shows marker endpoint storage database 108 as a component of AI system 100, and as being stored in system memory 106, that representation is merely exemplary. In other implementations, marker endpoint storage database 108 may not be a component of AI system 100, but may be a remote storage resource accessible to AI system 100 via communication network 150 and network communication links 152, for example.

With respect to the representation of AI system 100 shown in FIG. 1, it is noted that although software code 110 and marker endpoint storage database 108 are depicted as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to hardware processor of a computing platform, such as hardware processor 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

It is further noted that although FIG. 1 depicts software code 110 and marker endpoint storage database 108 as being mutually co-located in system memory 106, that representation is also merely provided as an aid to conceptual clarity. More generally, AI system 100 may include one or more computing platforms, such as computer servers for example, which may be co-located, or may form an interactively linked but distributed system, such as a cloud-based system. for instance. As a result, hardware processor 104 and system memory 106 may correspond to distributed processor and memory resources within AI system 100. Thus. it is to be understood that software code 110 and marker endpoint storage database 108 may be stored remotely from one another within the distributed memory resources of AI system 100.

Hardware processor 104 may include multiple hardware processing units, such as one or more central processing units, one or more graphics processing units, one or more tensor processing units, one or more field-programmable gate arrays (FPGAs), and an application programming interface (API) server. for example. By way of definition, as used in the present application, the terms "central processing unit" (CPU). "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as software code 110, from system memory 106, while a GPU may be implemented to reduce the processing overhead of the CPU by performing computationally intensive graphics or other processing tasks. A TPU is an application-specific integrated circuit (ASIC) configured specifically for AI applications such as ML modeling.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. In addition, or alternatively, in some implementations, AI system 100 may utilize a local area broadcast method, such as User Datagram Protocol (UDP) or Bluetooth, for instance. Furthermore, in some implementations, AI system 100 may be implemented virtually, such as in a data center. For example, in some implementations, AI system 100 may be implemented in software, or as virtual machines. Moreover, in some implementations, 5 communication network 150 may be a high-speed network suitable for high performance computing (HPC), for example a 10 GigE network or an Infiniband network.

Although user system 160 is shown as a desktop computer in FIG. 1, that representation is provided merely as an example as well. More generally, user system 160 may be any suitable mobile or stationary computing device or system that implements data processing capabilities sufficient to provide a user interface, support connections to communication network 150, and implement the functionality ascribed to user system 160 herein. For example, in other implementations, user system 160 and may take the form of a laptop computer, tablet computer, or smartphone.

With respect to display 162 of user system 160, display 162 may be physically integrated with user system 160, or may be communicatively coupled to but physically separate from respective user system 160. For example, where user system 160 is implemented as a smartphone, laptop computer, or tablet computer, display 162 will typically be integrated with user system 160. By contrast, where user system 160 is implemented as a desktop computer, display 162 may take the form of a monitor separate from user system 160 in the form of a computer tower. Furthermore, display 162 of user system 160 may be implemented as a liquid crystal display (LCD), a light-emitting diode (LED) display, an organic light-emitting diode (OLED) display, a quantum dot (QD) display, or any other suitable display screen that performs a physical transformation of signals to light.

FIG. 2A shows an exemplary diagram of software code 210 suitable for use by AI system 100, in FIG. 1, according to one implementation. According to the exemplary implementation shown in FIG. 2A, software code 210 includes content recognition module 212, AI-based pipeline for ad-slugged content 220, AI-based pipeline for seamless content 230, and AI-based pipeline for seamless content with chapter markers 240. In addition, FIG. 2A shows media content 256 received by software code 210, and one or more ad-break predictions 258 output by software code 210.

Media content 256 and one or more ad-break predictions 258 correspond respectively in general to media content 156 and one or more ad-break predictions 158, in FIG. 1. Consequently, media content 256 and one or more ad-break predictions 258 may share any of the characteristics attributed to respective media content 156 and one or more ad-break predictions 158 by the present disclosure, and vice versa.

Moreover, software code 210, in FIG. 2A, corresponds in general to software code 110, in FIG. 1, and those corresponding features may share any of the characteristics attributed to either corresponding feature by the present disclosure. Thus, although not shown in FIG. 1, software code 110 may include features corresponding respectively to content recognition module 212, AI-based pipeline for ad-slugged content 220, AI-based pipeline for seamless content 230, and AI-based pipeline for seamless content with chapter markers 240. It is noted that AI-based pipeline for ad-slugged content 220. AI-based pipeline for seamless content 230, and AI-based pipeline for seamless content with chapter markers 240 are described in greater detail below by reference to respective FIGS. 2B, 2C, and 2D.

Figure 2B:
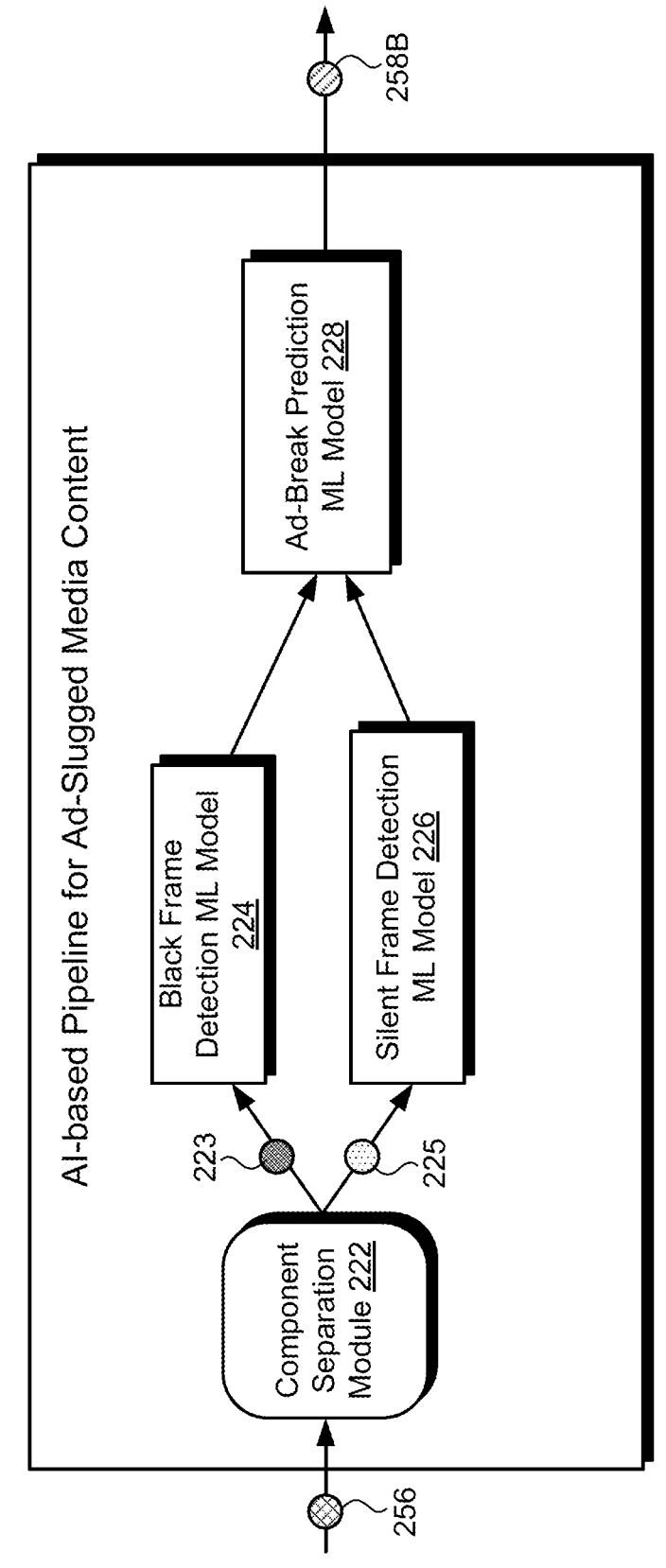
FIG. 2B shows an exemplary diagram of an AI-based pipeline included in the software code of FIG. 2A for ad-slugged media content, according to one implementation.

Referring to FIG. 2B, FIG. 2B shows a more detailed exemplary diagram of AI-based pipeline for ad-slugged content 220, according to one implementation. As shown in FIG. 2B, AI-based pipeline for ad-slugged content 220 may include component separation module 222, black frame detection ML model 224, silent frame detection ML model 226 and ad-break prediction ML model 228. Also shown in FIG. 2B are media content 256, one or more ad-break predictions 258B for ad-slugged content, video component 223 of media content 256, and audio component 225 of media content 256.

It is noted that one or more ad-break predictions 258B for ad-slugged content correspond in general to one or more ad-break predictions 158/258 in FIGS. 1 and 2A. Consequently, one or more ad-break predictions 258B for ad slugged content may share any of the characteristics attributed to one or more ad-break predictions 158/258 by the present disclosure, and vice versa.

As stated above, as defined in the present application, the expression "black." as applied to video frames, refers to frames that are completely dark or are a substantially uniform dark gray. It is also noted that, as defined in the present application. the expression "silent," as applied to video frames, refers to frames having no audio accompaniment or audio that is imperceptible to the human ear.

It is noted that any features identified in FIG. 2B by reference numbers identical to that/those shown in FIG. 2A correspond respectively to those previously shown and described features. Thus, although not shown in FIG. 2A, AI-based pipeline for ad-slugged content 220 in that previous figure may include features corresponding respectively to component separation module 222, black frame detection ML model 224, silent frame detection ML model 226, and ad-break prediction ML model 228.

AI-based pipeline for ad-slugged content 220 is configured to generate First Frame Commercial Black (FFCB) and Last Frame Commercial Black (LFCB) markers that identify the entry and exit points for ad-break segments in content containing natural commercial breaks in the form of ad-slugs. Ad-slugs are typically low audio volume or silent and contain darkened, faded, or black visual frames. AI-based pipeline for ad-slugged content 220 uses machine learning to identify portions of media content 256 that exhibit low-to-no volume and darkened, faded, or black visuals, subsequently placing the FFCB and LFCB markers at the start and end temporal points. Component separation module 222 and two trained ML models, i.e., black frame detection ML model 224 and silent frame detection ML model 226, pre-process incoming media content 256 at frame level evaluating audio and video features.

Component separation module 222 is configured to receive media content 256, to separate video component 223 from audio component 225, to output video component 223 to black frame detection ML model 224, and to output audio component 225 to silent frame detection ML model 226. Black frame detection ML model 224 may utilize frame-level hashing (a method of compressing visual frame images into a compact signal) and brightness checks to determine if a frame is both uniform in color and falls beneath a predetermined brightness threshold. The combination of brightness thresholding and color uniformity checks have been found to be resilient to encoding artifacts, watermarks, and variations in black frame visuals. Silent frame detection ML model 226 takes aggregated audio signals at frame level and computes the loudness (e.g., in dBs). A frame is evaluated to be silent if the loudness level if the loudness level of the frame falls beneath a predetermined loudness threshold.

Ad-break prediction ML model 228 is configured to perform a frame-by-frame evaluation of media content 256 based on the outputs of black frame detection ML model 224 and silent frame detection ML model 226 to predict the presence of one or more candidate ad-insertion points and a respective probability score associated with each of those one or more candidate ad-insertion points to provide one or more ad-break predictions 258B for media content 256 including ad-slugs. If several consecutive frames are determined to be both black and silent, they may be determined to belong to an ad-break and the FFCB and LFCB markers may be applied at the timestamps associated with the first and last frames of the predicted ad-break.

Evaluation and probability scoring of candidate ad-insertion points may be determined by the machine-learned statistical distribution of previously human reviewer approved segments in audio and video training data. Applying statistically learned thresholds in the audio and video signals, ad-break prediction ML model 228 can identify outlier candidate ad-insertion points that may require human review and can pass those candidates to a Quality Assurance (QA) flow for feedback and future learning. Additionally, if no ad-slugs are detected using AI-based pipeline for ad-slugged content 220, media content 256 may be automatically provided to AI-based pipeline for seamless content 230 for further evaluation.

Figure 2C:
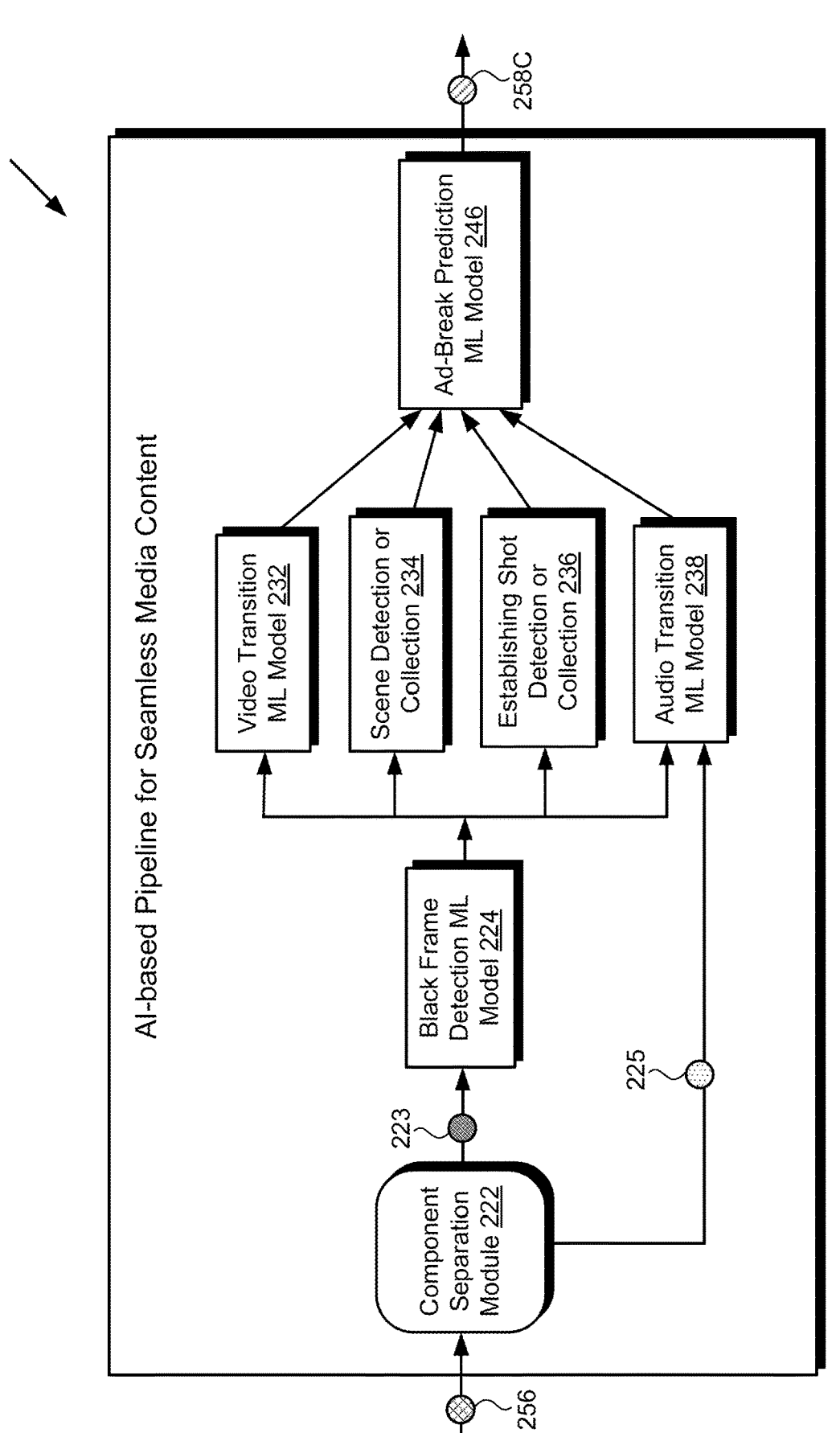
FIG. 2C shows an exemplary diagram of an AI-based pipeline included in the software code of FIG. 2A for seamless media content, according to one implementation.

FIG. 2C shows a more detailed exemplary diagram of AI-based pipeline for seamless content 230, according to one implementation. As shown in FIG. 2C, AI-based pipeline for seamless content 230 may include component separation module 222, black frame detection ML model 224, video transition ML model 232, scene detection or collection module 234, establishing scene detection or collection module 236, audio transition ML model 238 and seamless content ad-break prediction ML model 246. Also shown in FIG. 2C are media content 256, one or more ad-break predictions 258C for seamless content, video component 223 of media content 256, and audio component 225 of media content 256.

It is noted that one or more ad-break predictions 258C for seamless content correspond in general to one or more ad-break predictions 158/258 in FIGS. 1 and 2A. Consequently, one or more ad-break predictions 258C for seamless content may share any of the characteristics attributed to one or more ad-break predictions 158/258 by the present disclosure, and vice versa. It is further noted that any features identified in FIG. 2C by reference numbers identical to that/those shown in FIG. 2A correspond respectively to those previously shown and described features. Thus, although not shown in FIG. 2A, AI-based pipeline for seamless content 230 in that previous figure may include features corresponding respectively to component separation module 222, black frame detection ML model 224, video transition ML model 232, scene detection or collection module 234, establishing scene detection or collection module 236, audio transition ML model 238, and seamless content ad-break prediction ML model 246.

As noted above, component separation module 222 is configured to receive media content 256, to separate video component 223 from audio component 225, and to output video component 223 to black frame detection ML model 224. However, in contrast to AI-based pipeline for ad-slugged content 220 shown in FIG. 2B, in AI-based pipeline for seamless content 230, component separation module 222 outputs audio component 225 of media content 256 to audio transition ML model 238.

As further noted above, black frame detection ML model 224 may utilize frame-level hashing and brightness checks to determine if a frame is both uniform in color and falls beneath a predetermined brightness threshold. It is noted that for media content 256 that does not include ad-slugs, extra signals to help detect natural breaks within the narrative flow of media content 256 are needed. AI-based pipeline for seamless content 230 is configured to use content metadata including scenes (either manually annotated, i.e., collected, or algorithmically assigned by a scene detection ML model), establishing shots (either manually annotated, i.e., collected, or algorithmically assigned by an establishing scene detection ML model), along with ML model identified video and audio transitions.

It is noted that in the context of video, a "shot" refers to a sequence of video frames that is captured from a unique camera perspective without cuts and other cinematic transitions. A "scene" refers to a sequence of shots that correspond to one another thematically, either by sharing a common background or location, or by being directed to the same event, i.e., series of actions. An establishing shot may be used to signal the beginning of a new scene. For example, where the action to be depicted in a scene are to take place in a particular venue, such as a building or outdoor location for example, an establishing shot may provide a wide angle view of the venue and its environs, prior to subsequent shots of actions within the venue. Thus the time stamp or frame number of an establishing shot may indicate a natural ad-break preceding the establishing shot, while time stamps or frame numbers between establishing shots may be unlikely to provide good candidates for ad-breaks.

Regarding video transition ML model 232, it is noted that ideal ad-breaks typically occur around direct transitions to black (hard transitions) or fade-to-black transitions (soft transitions). The first and last frames around hard transition segments are easier to detect. Soft transitions can pose a problem because their fade/dissolve sequence can make it difficult to define the beginning and end of the fade frame sequence. Video transition ML model 232 is configured to check for soft and hard transitions as a supplement to black frame detection ML model 224. For example, video transition ML model 232 may be implemented as a Contrastive Language-Image Pre-Training (CLIP) model receiving the output of black frame detection ML model 224.

Audio transition ML model 238 is configured to ensure that expected audio breaks exhibit enough discontinuity to signal a natural transition point within audio component 225. Audio transition ML model 238 in the form of an NN, for example, may make comparisons between decomposed audio signals (e.g., in the form of spectrograms) taken before and after candidate ad-insertion points and evaluate the two signals for discontinuity. Discontinuity in the audio signal before and after the candidate ad-insertion point indicates that neither speech nor music are interrupted by the candidate ad-insertion point. Audio transition ML model 238 may also check for characteristic patterns in sound levels that indicate a purposeful decrease and subsequent increase in volume around the candidate ad insertion point.

Candidate ad-insertion points are evaluated by seamless content ad-break prediction ML model 246 based on the data and metadata described above by reference to black frame detection ML model 224, video transition ML model 232, and audio transition ML model 238, and in some implementations scene detection or collection module 234 and establishing scene detection or collection module 236 as well. Scene and establishing shot information help to ensure that scenes are not interrupted by ad-breaks and that the audio and visual transitions occur at the start and end of an ad-break. Evaluation and probability scoring of candidate ad-insertion points may be determined by the machine-learned statistical distribution of previously human reviewer approved segments in audio and video training data.

Figure 2D:
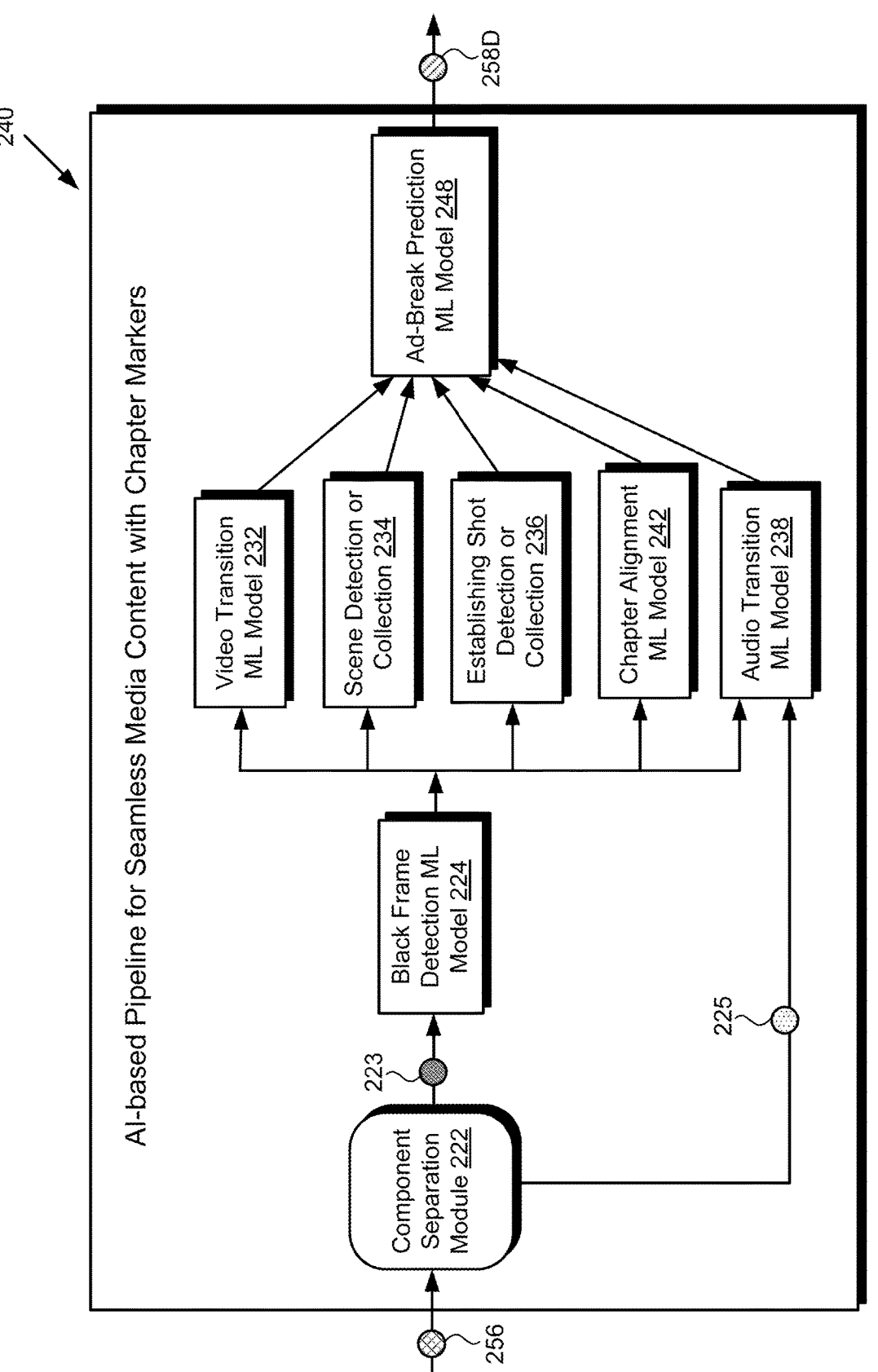
FIG. 2D shows an exemplary diagram of an AI-based pipeline included in the software code of FIG. 2A for seamless media content with chapter markers, according to one implementation.

FIG. 2D shows a more detailed exemplary diagram of AI-based pipeline for seamless content with chapter markers 240, according to one implementation. It is noted that like AI-based pipeline for seamless content 230, AI-based pipeline for seamless content with chapter markers 240 includes component separation module 222, black frame detection ML model 224, video transition ML model 232, scene detection or collection module 234, establishing scene detection or collection module 236, and audio transition ML model 238. However, in addition to those features, AI-based pipeline for seamless content with chapter markers 240 further includes chapter alignment ML model 238 and seamless content with chapter markers ad-break prediction ML model 248. Also shown in FIG. 2D are media content 256, one or more ad-break predictions 258D for seamless content with chapter markers, video component 223 of media content 256, and audio component 225 of media content 256.

It is further noted that one or more ad-break predictions 258D for seamless content with chapter markers correspond in general to one or more ad-break predictions 158/258 in FIGS. 1 and 2A. Consequently, one or more ad-break predictions 258D for seamless content with chapter markers may share any of the characteristics attributed to one or more ad-break predictions 158/258 by the present disclosure, and vice versa. It is also noted that any features identified in FIG. 2D by reference numbers identical to that/those shown in FIGS. 2A and 2C correspond respectively to those previously shown and described features. Thus, although not shown in FIG. 2A, AI-based pipeline for seamless content with chapter markers 240 in that previous figure may include features corresponding respectively to component separation module 222, black frame detection ML model 224, video transition ML model 232, scene detection or collection module 234, establishing scene detection or collection module 236, audio transition ML model 238, chapter alignment ML model 242, and seamless content with chapter markers ad-break prediction ML model 248.

Chapter alignment ML model 242 is configured to detect and correct errors in chapter alignment. Candidate ad-insertion points are evaluated by seamless content with chapter markers ad-break prediction ML model 248 based on the data and metadata described above by reference to black frame detection ML model 224, video transition ML model 232, scene detection or collection module 234, establishing scene detection or collection module 236, audio transition ML model 238, and also based on the location of chapter markers. As noted above, scene and establishing shot information ensure that scenes are not interrupted ad-breaks and that the audio and visual transitions occur at the start and end of an ad-break. Candidate ad-insertion points may be evaluated based on machine-learned characteristics using human reviewer approved training data.

Moreover, because chapter markers identify timestamps or frames deemed by creative authorities of media content 256 to be suitable as transition points in the narrative flow of media content 256, in use cases in which media content 256 includes chapter markers, each of the candidate ad-insertion points identified using ad-break prediction ML model 248 may be required to coincide with a chapter marker. That is to say, candidate ad-insertion points that fail to coincide with chapter markers may be prohibited.

The functionality of AI system 100 and software code 110/210 will be further described by reference to FIG. 3. FIG. 3 shows flowchart 370 presenting an exemplary method for performing AI-based ad-break prediction, according to one implementation. With respect to the method outlined in FIG. 3, it is noted that certain details and features have been left out of flowchart 370 in order not to obscure the discussion of the inventive features in the present application.

Referring now to FIG. 3 in combination with FIGS. 1, 2A, 2B, and 2C, flowchart 370 begins with: receive media content 156/256 including video component 223 and audio component 225 (action 371). As noted above, media content 156/256 may include AV content in a variety of forms, such as episodic TV content or movie content, for example. As further noted above, in addition, or alternatively, in some implementations, media content 156/256 may be or include digital representations of persons, fictional characters, locations, objects, and identifiers such as brands and logos, for example, which populate a VR, AR, or MR environment. Moreover, media content 156/256 may depict virtual worlds that can be experienced by any number of users synchronously and persistently, while providing continuity of data such as personal identity, user history, entitlements, possessions, payments, and the like. Moreover, and as also noted above, in some implementations, media content 156/256 may be or include a hybrid of traditional AV and fully immersive VR/AR/MR experiences, such as interactive video.

In some use cases, as noted above, media content 156/256 may be received from media content source 154, while in other use cases media content 156/256 may be received from user device 160 utilized by user 164. Media content 156/256 may be received, in action 371, by software code 110/210, executed by hardware processor 104 of AI system 100.

Flowchart 370 further includes: recognize whether media content 156/256 is ad-slugged media content or seamless media content (action 372). As described above, ad-slugged media content refers to media content that includes one or more pre-existing sequences of black frames free of audio and usable as ad-breaks, while seamless media content refers to media content that is entirely free of ad-slugs and other predetermined indicators of narrative transition. In some implementations. the recognition of media content as ad-slugged media content or seamless media content may be performed based on sampling or otherwise analyzing media content 156/256 for sequences of black frames. Alternatively, in some implementations, media content 156/256 may include metadata identifying media content 156/256 as ad-slugged media content or seamless media content. Action 372 may be performed by software code 110/210, executed by hardware processor 105 of AI system 100, and using content recognition module 212.

Flowchart 370 further includes: detect black video frames of media content 156/256 (action 373). As described above by reference to FIGS. 2B and 2C. black frame detection ML model 224 may be configured to utilize frame-level hashing, and brightness checks to detect black frames. That is to say, detecting black frames of media content 156/256 in action 373 may include performing a frame-level hashing of video component 223 of media content 156/256 to provide a respective hash for each video frame, and evaluating, using the respective hash, a brightness of each video frame relative to a predetermined brightness threshold.

In some implementations, the detection of black frames of media content 156/256 in action 373 may further include evaluating, using the respective hash of each video frame, a color uniformity of each video frame relative to a predetermined color uniformity threshold. It is noted that typically all black frames included in media content 156/256 will satisfy such a predetermined color uniformity threshold. In implementations in which media content 156/256 is recognized as ad-slugged content in action 372, the detection of black frames in media content 156/256 may be performed by software code 110/210. executed by hardware processor 104 of AI system 100, and using black frame detection ML model 224 of AI-based pipeline for ad-slugged content 220. Alternatively, in implementations in which media content 156/256 is recognized as seamless content in action 372, the detection of black frames in media content 156/256 may be performed by software code 110/210, executed by hardware processor 104 of AI system 100, and using black frame detection ML model 224 of AI-based pipeline for seamless content 230.

Flowchart 370 may further include: detect, when media content 156/256 is ad-slugged media content, silent video frames of the ad-slugged media content (action 374). As described above by reference to FIG. 2B, silent frame detection ML model 226 may be configured to take aggregated audio signals at frame level and to compute the loudness (e.g., in dBs). A frame is evaluated to be silent if the loudness level of the frame falls beneath a predetermined loudness threshold. Thus, detecting silent frames of media content 156/256 in action 374 may include aggregating audio signals of audio component 225 of media content on a per video frame basis to provide a respective frame-level audio signal for each video frame, and evaluating, using the respective frame-level audio signal, the loudness of each frame-level audio signal relative to the predetermined loudness threshold. Detection of silent frames in media content 156/256 may be performed by software code 110/210, executed by hardware processor 104 of AI system 100, and using silent frame detection ML model 226 of AI-based pipeline for ad-slugged content 220.

Flowchart 370 may further include: identify, using the black video frames and the silent video frames when media content 156/256 is ad-slugged media content, one or more candidate ad-insertion points for the ad-slugged media content and a respective probability score associated with each of the one or more candidate ad-insertion points, to provide one or more ad-break predictions 158/258/258B for the ad-slugged media content (action 375). As described above by reference to FIG. 2B, ad-break prediction ML model 228 is configured to perform a frame-by-frame evaluation of media content 156/256 based on the outputs of black frame detection ML model 224 and silent frame detection ML model 226 to predict the presence of one or more candidate ad-insertion points and a respective probability score associated with each of those one or more candidate ad-insertion points. If several consecutive frames are determined to be both black and silent, they may be determined to belong to an ad-break in the form of an ad-slug.

Evaluation and probability scoring of candidate ad-insertion points may be determined by the machine-learned statistical distribution of previously human reviewer approved segments in audio and video training data. Applying statistically learned thresholds in the audio and video signals, ad-break prediction ML model 228 can identify outlier candidate ad-insertion points that may require human review and can pass those candidates to a QA flow for feedback and future learning. However, when media content 156/256 is ad-slugged media content including multiple predetermined ad-slugs. ad-break predictions 158/258/258B for the ad-slugged content will typically each identify a respective one of the predetermined ad-slugs as a candidate ad-insertion point, and the respective probability scores associated with those candidate insertion points will usually be approximately the same. For example, where the probability score is expressed as a percentage, with one hundred percent signifying complete certainty and zero percent signifying complete uncertainty, the probabilities associated with predetermined ad-slugs identified by AI-based pipeline for ad-slugged content 220 can be expected to be clustered within a range of a few percent, such as up to ten percent for example.

As noted above, if no ad-slugs are detected using AI-based pipeline for ad-slugged media content 220, media content 156/256 may be automatically provided to AI-based pipeline for seamless content 230 for further evaluation. The one or more ad-break predictions provided in action 375 may be generated by software code 110/210, executed by hardware processor 104 of AI system 100, and using ad-break prediction ML model 228 of AI-based pipeline for ad-slugged content 220.

It is noted that actions 374 and 375 are performed only in use cases in which media content 156/256 is recognized as ad-slugged media content in action 372. In use cases in which media content 156/256 is recognized as being seamless media content in action 372, actions 374 and 375 may be omitted, and the method outlined by flowchart 370 may move directly from action 373 to: perform evaluations of blackness transitions between sequential video frames, and performing one or more evaluations of audio continuity across respective one or more sequences of black video frames (action 376).

Referring to FIGS. 1, 2A, 2C, and 3 in combination, the evaluations of blackness transitions between sequential video frames occurring in action 376 may be performed by software code 110/210, executed by hardware processor 104 of AI system 100, and using video transition ML model 232 of AI-based pipeline for seamless media content 230. Regarding video transition ML model 232, as noted above, ideal ad-breaks typically occur around direct transitions to black (hard transitions) or fade-to-black transitions (soft transitions). Video transition ML model 232 is configured to check for soft and hard transitions as a supplement to black frame detection ML model 224. In some implementations for example, and as also noted above, video transition ML model 232 may be take the form of a CLIP model receiving the output of black frame detection ML model 224.

The one or more evaluations of audio continuity across respective one or more sequences of black video frames occurring in action 376 may be performed by software code 110/210, executed by hardware processor 104 of AI system 100, and using audio transition ML model 238 of AI-based pipeline for seamless media content 230. Audio transition ML model 238 is configured to ensure that expected audio breaks exhibit enough discontinuity to signal a natural transition point within audio component 225 of media content 156/256. Audio transition ML model 238 in the form of an NN, for example, may make comparisons between decomposed audio signals (e.g., in the form of spectrograms) taken before and after candidate ad-insertion points and evaluate the two signals for discontinuity. Discontinuity in the audio signal before and after the candidate ad-insertion point indicates that neither speech nor music are interrupted by the candidate ad-insertion point. Audio transition ML model 238 may also check for characteristic patterns in sound levels that indicate a purposeful decrease and subsequent increase in volume around the candidate ad insertion point.

In use cases in which media content 156/256 is recognized to be seamless media content in action 372, flowchart 370 further includes: identify, using the black video frames, the evaluations of blackness transitions between sequential video frames, and the one or more evaluations of audio continuity across respective one or more sequences of black video frames, one or more candidate ad-insertion points for the seamless media content and a respective probability score associated with each of the one or more candidate ad-insertion points to provide one or more ad-break predictions 158/258/258C for the seamless media content (action 377).

As described above by reference to FIG. 2C, candidate ad-insertion points are evaluated by seamless content ad-break prediction ML model 246 based on the data and metadata provided by black frame detection ML model 224, video transition ML model 232, and audio transition ML model 238, and in some implementations by data and metadata provided by scene detection or collection module 234 and establishing scene detection or collection module 236 as well. When utilized by seamless content ad-break prediction ML model 246, scene and establishing shot information can help to ensure that scenes are not interrupted by ad-breaks and that audio and visual transitions occur at the start and end of an ad-break. As noted above, evaluation and probability scoring of candidate ad-insertion points may be determined by the machine-learned statistical distribution of previously human reviewer approved segments in audio and video training data. Action 377 may be performed by software code 110/210, executed by hardware processor 104 of AI system 100, and using seamless content ad-break prediction ML model 246 of AI-based pipeline for seamless media content 230.

Thus, in performing actions 373, 374, and 375 to generate one or more ad-break predictions 258B for ad-slugged media content, software code 110/210, executed by hardware processor 104 of AI system 100, utilizes multiple trained ML models, i.e., black frame detection ML model 224, silent frame detection ML model 226, and ad-break prediction ML model 228 of AI-based pipeline for ad-slugged media content 220. Moreover, in performing actions 373, 376, and 377 to generate one or more ad-break predictions 258C for seamless media content, software code 110/210, executed by hardware processor 104 of AI system 100, utilizes multiple other trained ML models, i.e., at least black frame detection ML model 224, video transition ML model 232, audio transition ML model 238, and seamless content ad-break prediction ML model 246 of AI-based pipeline for seamless media content 230.

Flowchart 370 further includes: output one or more ad-break predictions 158/258/258B for ad-slugged media content or one or more ad-break predictions 158/258/258C for seamless media content (action 378). Action 378 may be performed by software code 110/210, executed by hardware processor 104 of AI system 100. In some use cases, one or more ad-break predictions 158/258/258B for ad-slugged media content or one or more ad-break predictions 158/258/258C for seamless media content may be output to marker endpoint storage database 108. In addition, or alternatively, in some use cases one or more ad-break predictions 158/258/258B for ad-slugged media content or one or more ad-break predictions 158/258/258C for seamless media content may be output to user system 160 utilized by user 164.

In some use cases, as discussed above by reference to FIG. 2D, media content 156/256 may be seamless media content with one or more chapter markers. In those use cases, as noted above, identifying the one or more candidate ad-insertion points for the seamless media content with the one or more chapter markers, and the respective probability score associated with each of the candidate ad-insertion points, further uses the one or more chapter markers. Furthermore, when chapter markers are present, the ad-breaks for the seamless media content with those chapter markers may be constrained to be located only at the chapter markers. In other words, in some implementations, each of the one or more candidate ad-insertion points for seamless media content with chapter markers must coincide with a respective one of the chapter markers.

According to some implementations, in use cases in which one or more ad-break predictions 158/258/258B for ad-slugged media content are output in action 378, hardware processor 104 of AI system 100 may execute software code to receive feedback data 166 providing at least one of a correction or a ratification of at least one ad-break prediction 158/258/258B for the ad-plugged media content, and further train, using feedback data 166, one or more of the multiple trained ML models used to generate one or more ad-break predictions 158/258/258B for ad-slugged media content, thereby improving the performance of AI system 100 over time. Moreover, in use cases in which one or more ad-break predictions 158/258/258C for seamless media content are output in action 378, hardware processor 104 of AI system 100 may execute software code to receive feedback data 166 providing at least one of a correction or a ratification of at least one ad-break prediction 158/258/258C for the seamless media content, and further train, using feedback data 166, one or more of the other multiple trained ML models used to generate one or more ad-break predictions 158/258/258C for seamless media content, thereby also improving the performance of AI system 100 over time.

With respect to the performance of the ML models implemented as part of AI system 100, it is noted that because machine learning based inference requires a source of truth which may not have been available prior to deployment of AI system 100, ad-breaks may initially be evaluated based on a series of logical rules using the media content metadata generated by AI-based pipelines 220, 230, and 240 (e.g., audio and video transitions, scene and establishing shot detection metadata).

A human-in-the loop deployment enables the collection of human feedback data 166 indicating whether a human evaluator accepts a predicted ad-break, rejects a predicted ad-break, or creates a different ad-break. Feedback data 166 can be combined with features derived from temporal content metadata (a combination of binarized encoded and confidence scored features) that were initially used to identify and return candidate ad-insertion points, to create a training dataset. Using machine learning techniques, the model weights of a binary classifier can then be optimized based on the feedback training dataset. Once these weights are tuned, newly identified ad-insertions points may be scored. The resulting probability score estimates the confidence that an ad-insertion point will be accepted by a human reviewer. Model weights can be updated according to feedback data 166 via the training process to continually adapt the score according to the latest feedback.

The feedback process for updating the confidence score can proceed as follows: AI system 100 evaluates media content 156/256 and predicts one or more ad-breaks, human user 164 reviews each predicted ad-break and provides feedback data 166 accepting or rejecting the ad-break prediction(s), feedback data 166 and supporting metadata (e.g., audio, story, and video temporal tags) for each predicted ad-break are then fed back into a training set. Once a pre-determined batch size of media content assets has been processed, the binary classifier model is retrained using the training data to update and optimize the model weights. The updating process can be repeated until a user defined criteria is satisfied (e.g., accuracy increases less than 0.1% in several iterations).

With respect to the method outlined by flowchart 370, it is noted that actions 371, 372, 373, 374, 375, and 378, or actions 371, 372, 373, 376, 377, and 378, or actions 371, 372, 373, 374, 375, 376, 377, and 378, may be performed as automated processes from which human involvement may be omitted.

Thus, the present application discloses AI-based systems and methods for predicting ad-breaks that overcomes the drawbacks and deficiencies in the conventional art. The present ad-break prediction solution advances the state-of-the art by introducing an AI based automated approach to identifying content aware ad-breaks in visual media content that are predicted to be minimally disruptive to the experience of consuming that content. Due to the use of multiple trained ML models, the present AI-based ad-break prediction solution is advantageously capable of emulating the performance quality of a human editor, but on a scale and at a speed that far surpass human capability, even with the assistance of a general purpose computing device. Moreover, the ML models implemented by the present AI system are configured to be retrained over time in response to feedback data so as to improve system performance until it converges to a desired degree of accuracy.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An artificial intelligence (AI) system comprising:
a computing platform having a hardware processor and a system memory storing a software code;
the hardware processor configured to execute the software code to:
    receive a media content including a video component and an audio component;
    determine whether the media content is an ad-slugged media content that includes pre-determined ad-slugs or is a seamless media content that does not include any pre-determined ad-slugs;
    detect a plurality of black video frames of the media content;
    if the media content is determined to be the ad-slugged media content that includes the pre-determined ad-slugs, apply a first method of ranking ad-insertion points, the first method comprising:
        detecting a plurality of silent video frames of the media content; and
        predicting, using a first plurality of trained machine learning (ML) models and based on the plurality of black video frames and the plurality of silent video frames, one or more candidate ad-insertion points for the media content and a respective probability score associated with each of the one or more candidate ad-insertion points to provide one or more ad-break predictions for the media content;
    if the media content is determined to be the seamless media content that does not include any pre-determined ad-slugs, apply a second method different from the first method, the second method comprising:
        performing, using an ML model trained using contrastive learning, a first plurality of evaluations of fade-to-black transitions among sequential video frames of the seamless media content;
        performing, based on comparison of decomposed audio signals each sampled from a respective video frame of the seamless media content, one or more second evaluations of audio continuity across respective one or more sequences of the plurality of black video frames;
        predicting, using a second plurality of trained ML models different from the first plurality of trained ML models and based on the plurality of black video frames, the first plurality of evaluations, and the one or more second evaluations, one or more candidate ad-insertion points for the media content and a respective probability score associated with each of the one or more candidate ad-insertion points to provide one or more ad-break predictions for the media content; and
    output the one or more ad-break predictions for the media content.

2. The AI system of claim 1, wherein detecting the plurality of black frames comprises performing a frame-level hashing of the video component to provide a respective hash for each video frame, and evaluating, using the respective hash, a brightness of each video frame relative to a predetermined brightness threshold.

3. The AI system of claim 2, wherein detecting the plurality of black frames further comprises, evaluating, using the respective hash, a color uniformity of each video frame relative to a predetermined color uniformity threshold, and wherein each of the plurality of black frames satisfies the predetermined color uniformity threshold.

4. The AI system of claim 1, wherein detecting the plurality of silent frames comprises aggregating audio signals of the audio component on a per video frame basis to provide a respective frame-level audio signal for each video frame, and evaluating, using the respective frame-level audio signal, a loudness of each frame-level audio signal relative to a predetermined loudness threshold.

5. The AI system of claim 1, wherein the one or more ad-break predictions for the ad-slugged media content comprise a plurality of ad-break predictions each identifying a respective one of the plurality of predetermined ad-slugs as candidate ad-insertion points, and wherein the respective probability scores associated with the candidate insertion points are approximately the same.

6. The AI system of claim 1, wherein the seamless media content includes one or more chapter markers, and wherein predicting the one or more candidate ad-insertion points for the seamless media content and the respective probability score associated with each of the candidate ad-insertion points further uses the one or more chapter markers.

7. The AI system of claim 6, wherein each of the one or more candidate ad-insertion points for the seamless media content coincides with a respective one of the one or more chapter markers.

US 12,587,693 B2

17

8. The AI system of claim 1, wherein if the media content is determined to be the ad-slugged media content that includes the pre-determined ad-slugs, the hardware processor is further configured to execute the software code to:

receive a feedback data providing at least one of a correction or a ratification of the at least one ad-break prediction for the ad-plugged media content, output by the AI system; and further train, using the feedback data, one or more of the first plurality of trained ML models, thereby improving a performance of the AI system over time.

9. The AI system of claim 1, wherein if the media content is determined to be the seamless media content that does not include any pre-determined ad-slugs, the hardware processor is further configured to execute the software code to:

receive a feedback data providing at least one of a correction or a ratification of the at least one ad-break prediction for the seamless media content, output by the AI system; and further train, using the feedback data, one or more of the second plurality of trained ML models, thereby improving a performance of the AI system over time.

10. The AI system of claim 1, wherein the media content includes media content metadata identifying at least one of a scene or an establishing shot of the media content, and wherein if the media content is determined to be the seamless media content, predicting the one or more candidate ad-insertion points for the media content and the respective probability score associated with each of the one or more candidate ad-insertion points further uses the media content metadata.

11. A method for use by an artificial intelligence (AI) system including a computing platform having a hardware processor and a system memory storing a software code, the method comprising:

receiving, by the software code executed by the hardware processor, a media content including a video component and an audio component;

determining, by the software code executed by the hardware processor, whether the media content is an ad-slugged media content that includes pre-determined ad-slugs or is a seamless media content that does not include any pre-determined ad-slugs;

detecting, by the software code executed by the hardware processor, a plurality of black video frames of the media content;

if the media content is determined to be the ad-slugged media content that includes the pre-determined ad-slugs, applying a first method of ranking ad-insertion points, the first method comprising:

detecting, by the software code executed by the hardware processor, a plurality of silent video frames of the media content; and predicting, by the software code executed by the hardware processor and using a first plurality trained machine learning (ML) models and based on the plurality of black video frames and the plurality of silent video frames, one or more candidate ad-insertion points for the media content and a respective probability score associated with each of the one or more candidate ad-insertion points to provide one or more ad-break predictions for the media content; and;

if the media content is determined to be the seamless media content that does not include any pre-determined ad-slugs, applying a second method different from the first method, the second method comprising:

performing, by the software code executed by the hardware processor and using an ML model trained using contrastive learning,, a first plurality of evaluations of fade-to-black transitions among sequential video frames of the seamless media content;

performing, by the software code executed by the hardware processor based on comparison of decomposed audio signals each sampled from a respective video frame of the seamless media content, one or more second evaluations of audio continuity across respective one or more sequences of the plurality of black video frames;

predicting, by the software code executed by the hardware processor and using a second plurality of trained ML model different from the first plurality of ML models and based on the plurality of black video frames, the first plurality of evaluations, and the one or more second evaluations, one or more candidate ad-insertion points for the media content and a respective probability score associated with each of the one or more candidate ad-insertion points to provide one or more ad-break predictions for the media content; and outputting, by the software code executed by the hardware processor, the one or more ad-break predictions for the media content.

12. The method of claim 11, wherein detecting the plurality of black frames comprises performing a frame-level hashing of the video component to provide a respective hash for each video frame, and evaluating, using the respective hash, a brightness of each video frame relative to a predetermined brightness threshold.

13. The method of claim 12, wherein detecting the plurality of black frames further comprises, evaluating, using the respective hash, a color uniformity of each video frame relative to a predetermined color uniformity threshold, and wherein each of the plurality of black frames satisfies the predetermined color uniformity threshold.

14. The method of claim 11, wherein detecting the plurality of silent frames comprises aggregating audio signals of the audio component on a per video frame basis to provide a respective frame-level audio signal for each video frame, and evaluating, using the respective frame-level audio signal, a loudness of each frame-level audio signal relative to a predetermined loudness threshold.

15. The method of claim 11, wherein the one or more ad-break predictions for the ad-slugged media content comprise a plurality of ad-break predictions each identifying a respective one of the plurality of predetermined ad-slugs as candidate ad-insertion points, and wherein the respective probability scores associated with the candidate insertion points are approximately the same.

16. The method of claim 11, wherein the seamless media content includes one or more chapter markers, and wherein predicting the one or more candidate ad-insertion points for the seamless media content and the respective probability score associated with each of the candidate ad-insertion points further uses the one or more chapter markers.

17. The method of claim 16, wherein each of the one or more candidate ad-insertion points for the seamless media content coincides with a respective one of the one or more chapter markers.

18. The method of claim 11, further comprising:

if the media content is determined to be the ad-slugged media content that includes the pre-determined ad-slugs:

receiving, by the software code executed by the hardware processor, a feedback data providing at least one of a correction or a ratification of the at least one ad-break prediction for the ad-slugged media content, output by the AI system; and further training, by the software code executed by the hardware processor and using the feedback data, one or more of the first plurality of trained ML models, thereby improving a performance of the AI system over time.

19. The method of claim 11, further comprising:

if the media content is determined to be the seamless media content that does not include any pre-determined ad-slugs:

receiving, by the software code executed by the hardware processor, a feedback data providing at least one of a correction or a ratification of the at least one ad-break prediction for the seamless media content, output by the AI system; and further training, by the software code executed by the hardware processor and using the feedback data, one or more of the second plurality of trained ML models, thereby improving a performance of the AI system over time.

20. The method of claim 11, wherein the media content includes media content metadata identifying at least one of a scene or an establishing shot of the media content, and wherein if the media content is determined to be the seamless media content, predicting the one or more candidate ad-insertion points for the media content and the respective probability score associated with each of the one or more candidate ad-insertion points further uses the media content metadata.

* * * * *